(12) United States Patent
Sirin et al.

(10) Patent No.: US 10,983,296 B2
(45) Date of Patent: Apr. 20, 2021

(54) FIRE RESISTANT FIBER OPTIC CABLE WITH HIGH FIBER COUNT

(71) Applicant: Prysmian S.p.A., Milan (IT)

(72) Inventors: Zekeriya Sirin, Milan (IT); Baris Soenmez, Milan (IT); Can Altingoez, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 16/649,871

(22) PCT Filed: Oct. 6, 2017

(86) PCT No.: PCT/EP2017/075455
§ 371 (c)(1),
(2) Date: Mar. 23, 2020

(87) PCT Pub. No.: WO2019/068340
PCT Pub. Date: Apr. 11, 2019

(65) Prior Publication Data
US 2020/0271881 A1    Aug. 27, 2020

(51) Int. Cl.
*G02B 6/44* (2006.01)
(52) U.S. Cl.
CPC ......... *G02B 6/4436* (2013.01); *G02B 6/4432* (2013.01); *G02B 6/4434* (2013.01)
(58) Field of Classification Search
None
See application file for complete search history.

(56) References Cited

U.S. PATENT DOCUMENTS

| 3,576,940 A | 5/1971 | Stone et al. |
| 4,659,871 A | 4/1987 | Smith et al. |

(Continued)

FOREIGN PATENT DOCUMENTS

| AU | 4832685 A | 4/1986 |
| CN | 103928172 A | 7/2014 |

(Continued)

OTHER PUBLICATIONS

ASTM International, Designation: D2863-121, "Standard Test Method for Measuring the Minimum Oxygen Concentration to Support Candle-Like Combustion of Plastics (Oxygen Index)," 2013, 14 pages.

(Continued)

*Primary Examiner* — Michael Stahl
(74) *Attorney, Agent, or Firm* — Slater Matsil, LLP

(57) ABSTRACT

In one embodiment, a fiber optic cable comprises a core comprising a central strength member and a plurality of buffer tubes arranged around the central strength member, where each buffer tube includes a plurality of optical fibers. The fiber optic cable includes a mica layer arranged around the core, a glass yarn layer surrounding and in direct contact with the mica layer, an inner sheath surrounding and in direct contact with the glass yarn layer, a metal armor surrounding the inner sheath; and an outer sheath surrounding and in direct contact with the metal armor. The central strength member comprises a hydroxide-containing flame retardant polymeric material, and the plurality of buffer tubes contain a water-blocking filling material comprising a (Continued)

silicone gel, where the silicone gel has a drop point of at least 200° C., and where the fiber optical cable is configured to be fire resistant.

20 Claims, 1 Drawing Sheet

(56) References Cited

U.S. PATENT DOCUMENTS

| | | | |
|---|---|---|---|
| 5,310,964 A | 5/1994 | Roberts et al. | |
| 5,390,273 A | 2/1995 | Rahman et al. | |
| 6,317,540 B1 | 11/2001 | Foulger et al. | |
| 6,392,152 B1 | 5/2002 | Mottine, Jr. et al. | |
| 7,923,638 B2 | 4/2011 | Kaczmarski | |
| 2002/0001715 A1 | 1/2002 | Redondo et al. | |
| 2002/0117325 A1 | 8/2002 | Mennone et al. | |
| 2003/0075354 A1 | 4/2003 | Kuss et al. | |
| 2003/0103742 A1* | 6/2003 | Auvray | G02B 6/4436 385/109 |
| 2011/0153968 A1 | 6/2011 | Hiraiwa et al. | |
| 2011/0266052 A1 | 11/2011 | Glew | |
| 2013/0161058 A1 | 6/2013 | Camp, II et al. | |
| 2014/0290976 A1 | 10/2014 | Nishi et al. | |
| 2014/0291019 A1 | 10/2014 | Mayer-Rosa et al. | |
| 2015/0131952 A1 | 5/2015 | Gallo et al. | |
| 2016/0233007 A1 | 8/2016 | Truong et al. | |
| 2017/0153405 A1 | 6/2017 | Bringuier et al. | |
| 2020/0310059 A1* | 10/2020 | Sirin | G02B 6/4436 |

FOREIGN PATENT DOCUMENTS

| | | |
|---|---|---|
| EP | 0237440 A2 | 9/1987 |
| EP | 1257861 A1 | 11/2002 |
| EP | 1426804 A2 | 6/2004 |
| EP | 1956404 A1 | 8/2008 |
| EP | 2413331 A1 | 2/2012 |
| GB | 2138168 A | 10/1984 |
| GB | 2170646 A | 8/1986 |
| JP | 2005182532 A | 7/2005 |
| WO | 2014081096 A1 | 5/2014 |
| WO | 2015040448 A1 | 3/2015 |
| WO | 2017097350 A1 | 6/2017 |
| WO | WO 2019/145046 A1 * | 8/2019 |
| WO | WO 2019/233572 A1 * | 12/2019 |

OTHER PUBLICATIONS

Caledonian Cables Ltd, "Fire resistant Multi Loose Tube Fiber Optic Cables," Nov. 2016, 6 pages.
Caledonian Cables Ltd, FireFlix Catalogue, "Fire Resistant Fiber Optic Cables," http://www.caledonian-cables.co.uk/DdFls/Fire%20Resistant%20Cable/fire%20resistant%20fiber%20cables.pdf, 2016, 43 pages.

* cited by examiner

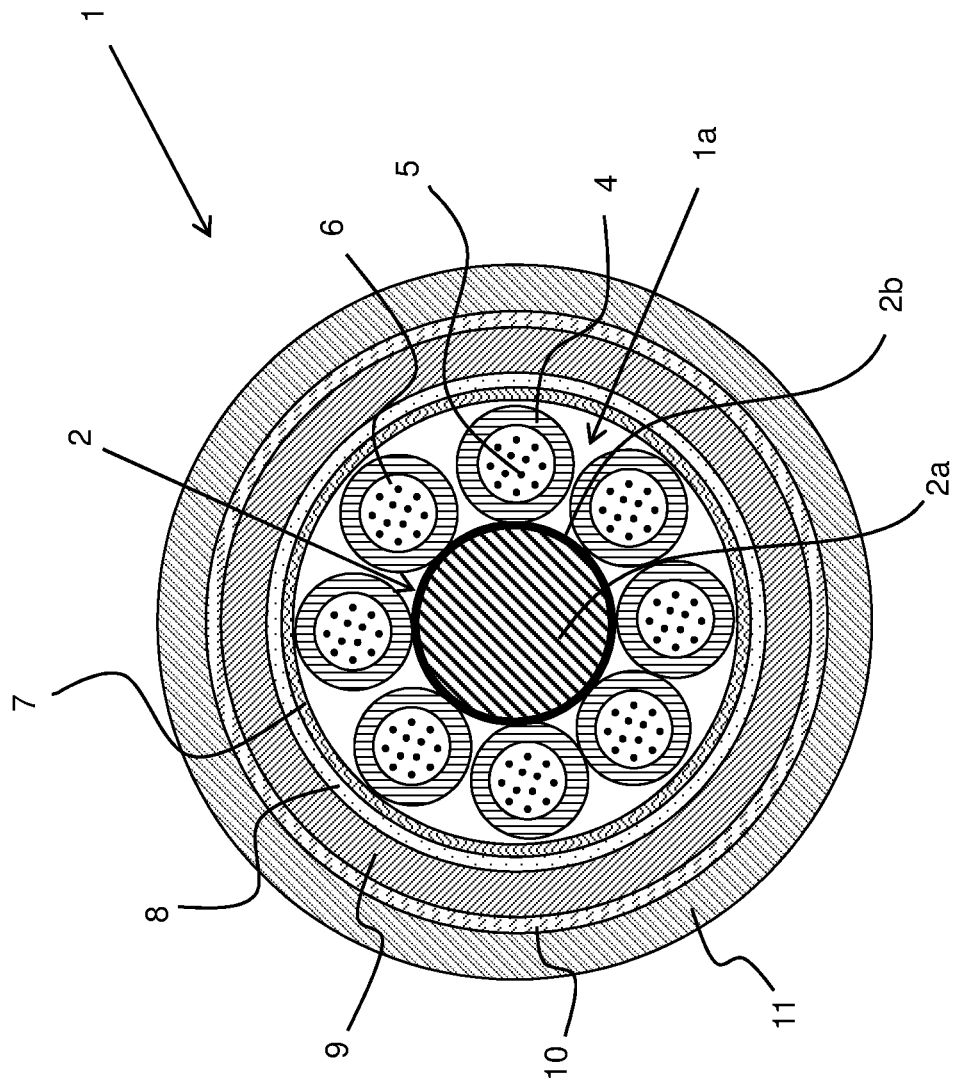

FIRE RESISTANT FIBER OPTIC CABLE WITH HIGH FIBER COUNT

CROSS-REFERENCE TO RELATED APPLICATIONS

This application is a national stage of International Application No. PCT/EP2017/075455, filed on Oct. 6, 2017, which application is hereby incorporated herein by reference in its entirety.

TECHNICAL FIELD

This application relates to optic cables and in particular to fire resistant fiber optic cable with high fiber count.

BACKGROUND

In certain applications, optical cables should be able to withstand fire without significantly decreasing of their transmission performance. For instance, cables used in fire alarm systems and/or local video surveillance should be able to continue to transmit data/signals in the presence of fire.

GB 2 138 168 discloses a fire resistant fiber cable comprising an optical fibre. The cable can comprise an inner core of fiber reinforced plastics, around which the optical fibers are placed. Around each of the optical fibers there is provided a jacket of organic material, and the spaces between the fiber and the jacket are filled up with silicone grease. Around each jacket of organic material there is wound a layer of mica tape, preferably arranged on a glass carrier. Around one or a group of organic jackets with fire retardant covers there is provided a layer of glass tape. Outside the glass tape there is provided a filler jacket having good fire retardant properties. Outside said filler jacket there may be an armour, braiding, covering or wiring of glass, steel or other fire-proof material.

US 2015/0131952 discloses a fire resistant optical communication cable. The cable comprises a plurality of core elements including bundles of optical fibers located within tubes arranged around a central strength member formed from glass-reinforced plastic. A layer located outside of and surrounding the elements of core may be a fire retardant tape such as mica tape. An armor layer may be located outside of the fire retardant layer. A plurality of particles of an intumescent material is embedded within the material of cable jacket.

FIREFLIX catalogue of Caledonian Cables Ltd (2016, page 30) discloses, inter alia, a fire resistant armoured fiber optic cable comprising a central loose tube containing 2-24 fibers, filled with water-blocking gel, said tube being wrapped with a fire blocking mica glass tape. fiber glass is wound around the tube to provide physical protection and tensile strength, with added fire protection. The cable can be jacketed with a thermoplastic LSZH (low smoke zero halogen) inner sheath. Around said inner sheath, a corrugated steel tape armor and an outer LSZH sheath are provided.

FIREFLIX catalogue of Caledonian Cables Ltd (2016, page 35) discloses, inter alia, a fire resistant armoured fiber optic cable comprising from 5 to 36 fiber containing tubes, stranded around a central strength member. The central strength member can be made of glass fiber reinforced plastics. Each tube contains from 4 to 12 fibers and is filled with a water-blocking gel. The tubes are individually wound with fire blocking mica glass tape. The jelly filled tube is water-blocked by using swellable tape and thread. The cable is jacketed with an inner sheath in thermoplastic material LSZH, around which a corrugated steel tape armor and an outer LSZH sheath are provided.

SUMMARY

In one embodiment, a fiber optic cable comprises a core comprising a central strength member and a plurality of buffer tubes arranged around the central strength member, where each buffer tube includes a plurality of optical fibers. The fiber optic cable includes a mica layer arranged around the core, a glass yarn layer surrounding and in direct contact with the mica layer, an inner sheath surrounding and in direct contact with the glass yarn layer, a metal armor surrounding the inner sheath; and an outer sheath surrounding and in direct contact with the metal armor. The central strength member comprises a hydroxide-containing flame retardant polymeric material, and the plurality of buffer tubes contain a water-blocking filling material comprising a silicone gel, where the silicone gel has a drop point of at least 200° C., and where the fiber optical cable is configured to be fire resistant.

BRIEF DESCRIPTION OF THE DRAWINGS

The present disclosure will become fully clear after reading the following detailed description, given by way of example and not of limitation, with reference to the attached FIG. 1 which is a cross-section of a fire resistant fiber optic cable according an embodiment of the present disclosure.

DETAILED DESCRIPTION OF ILLUSTRATIVE EMBODIMENTS

The Applicant has faced the problem of providing a fiber optic cable with high fiber count capable of maintaining its performance not only during fire but also for a predetermined period of time after the fire is extinguished.

Optical fibers have a coefficient of thermal expansion lower than that of the polymeric buffer tubes housing them. During the cooling after fire, the buffer tube shrinkage can mechanically stress the optical fibers up to breakage. As a result, the cable functionality, which was maintained during fire, may be impaired and the signal attenuated or even interrupted.

The Applicant has experienced that damage to the optical fiber after fire was reduced by providing a silicone gel as water-blocking material inside the buffer tubes, said silicone gel having a drop point higher than 200° C.

Silicone is generally a very stable polymer, a great deal of this stability deriving from reversible hydrolysis reactions occurring under heating such that the polymer essentially heals itself. Applicant observed that a silicone gel surrounding the optical fibers during and after fire could provide some protection against mechanical stress.

Aiming at a further reduction of optical fiber breakage after fire, the Applicant found that a hydroxide-containing flame retardant material in radially inner position with respect to the arrangement of buffer tubes which contain the optical fibers enabled a further reduction or even avoidance of said optical fiber breakage.

Hydroxides like magnesium hydroxide and aluminum hydroxide are used as flame retardant fillers because of their capability of releasing water during fire. Without wishing being bound to any theory, the Applicant conjectured that the hydroxide contained in a flame retardant material in radial inner position with respect to the buffer tubes, though not directly reached by the flame, was anyway subjected to a temperature triggering the release of an amount of water suitable for lowering the heat the buffer tubes. Accordingly, the buffer tube polymeric material underwent a lower thermal expansion which the silicone gel water-blocking material was able to fully compensate during cooling after fire with limited stress to the optical fibre.

In addition, the presence of hydroxide-containing flame retardant material in radial inner position with respect to the buffer tubes allows using a single fire barrier surrounding all of the buffer tubes together, rather than other arrangements such as a fire barrier around each single tube, enabling a saving of material for the fire barrier and a manufacturing process simplification.

Therefore, according to a first aspect, the present disclosure provides a fire resistant fiber optic cable comprising: a core comprising: a central strength member, and a plurality of buffer tubes arranged around the central strength member, each buffer tube containing a plurality of optical fibers; a mica layer arranged around the core; a glass yarn layer surrounding and in direct contact with the mica layer; an inner sheath surrounding and in direct contact with the glass yarn layer; a metal armor surrounding the inner sheath; and an outer sheath surrounding and in direct contact with the metal armour, wherein the central strength member comprises a hydroxide-containing flame retardant polymeric material, and wherein the buffer tubes contain a water-blocking filling material comprising a silicone gel, wherein said silicone gel has a drop point of at least 200° C.

In an embodiment, the fiber optic cable of the present disclosure comprises at least twenty-four (24) optical fibers. The fiber optic cable can contain up to 144 optical fibers.

The number of buffer tubes in a cable and the number of optical fibers contained in each buffer tube may vary according to cable specification or customer request. For example, each buffer tube may contain from 5 to 12 optical fibers.

In some embodiments, the central strength member comprises a body of reinforced dielectric material. In an alternative embodiment, the central strength member comprises a body of metallic material, such as steel.

In an embodiment, the hydroxide-containing flame retardant polymeric material is embedded in the reinforced dielectric material of the central strength member. In another embodiment, the hydroxide-containing flame retardant polymeric material of the central strength member is in the form of a layer applied on the outer surface of the body of the central strength member.

In an embodiment, the hydroxide-containing flame retardant polymeric material of the central strength member has a limiting oxygen index (LOI)≤35%.

In an embodiment, the hydroxide-containing flame retardant polymeric material of the central strength member is a low smoke zero halogen material (LSoH or LSZH), a.k.a. halogen-free flame retardant material (HFFR). Flame retardant LSoH materials do not release toxic fumes.

In the present description and claims, as "hydroxide-containing flame retardant polymeric material" it is meant a polymeric material containing an inorganic flame-retardant filler selected from: metal hydroxides, hydrated metal oxides, metal salts having at least one hydroxyl group, and hydrated metal salts, said filler being capable of releasing water when heated.

In an embodiment, the hydroxide-containing flame retardant polymeric material of the central strength member comprises a flame-retardant filler selected from aluminum or magnesium hydroxide, aluminum or magnesium hydrated oxide, aluminum or magnesium salt having at least one hydroxyl group or aluminum or magnesium hydrated salt.

In an embodiment, the hydroxide-containing flame retardant polymeric material of the central strength member comprises magnesium hydroxide, alumina trihydrate or hydrated magnesium carbonate. In another embodiment, the hydroxide-containing flame retardant polymeric material of the central strength member comprises magnesium hydroxide.

Magnesium hydroxide is characterized by a decomposition temperature of about 340° C. and thus allows high extrusion temperatures to be used. The magnesium hydroxide of the present disclosure can be of synthetic or natural origin, the latter being, obtained by grinding minerals based on magnesium hydroxide, such as brucite or the like, as described, for example, in WO2007/049090.

The flame-retardant filler can be used in the form of particles which are untreated or surface-treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like. In order to increase the compatibility with the polymer material, the flame-retardant filler can likewise be surface-treated with suitable coupling agents, for example short chain organic silanes or titanates such as vinyltriethoxysilane, vinyltriacetylsilane, tetraisopropyl titanate, tetra-n-butyl titanate and the like.

In an embodiment, the hydroxide-containing LSoH flame retardant polymeric material of the central strength member comprises a polymer selected from: polyethylene; copolymers of ethylene with at least one α-olefin containing from 3 to 12 carbon atoms, and optionally with at least one diene containing from 4 to 20 carbon atoms; polypropylene; thermoplastic copolymers of propylene with ethylene and/or at least one α-olefin containing from 4 to 12 carbon atoms; copolymers of ethylene with at least one ester selected from alkyl acrylates, alkyl methacrylates and vinyl carboxylates, wherein the alkyl and the carboxylic groups comprised therein are linear or branched, and wherein the linear or branched alkyl group may contain from 1 to 8, preferably from 1 to 4, carbon atoms, while the linear or branched carboxylic group may contain from 2 to 8, preferably from 2 to 5, carbon atoms; and mixtures thereof.

With "α-olefin" it is generally meant an olefin of formula $CH_2=CH-R$, wherein R is a linear or branched alkyl having from 1 to 10 carbon atoms. The α-olefin can be selected, for example, from propylene, 1-butene, 1-pentene, 4-methyl-1-pentene, 1-hexene, 1-octene, 1-dodecene and the like. Among them, propylene, 1-butene, 1-hexene and 1-octene are particularly preferred.

Examples of polymer that may be used in the flame retardant LSoH polymeric material for the central strength member of the present disclosure are: high-density polyethylene (HDPE) (d=0.940-0.970 $g/cm^3$), medium-density polyethylene (MDPE) (d=0.926-0.940 $g/cm^3$), low-density polyethylene (LDPE) (d=0.910-0.926 $g/cm^3$); linear low-density polyethylene (LLDPE) and very-low-density polyethylene (VLDPE) (d=0.860-0.910 $g/cm^3$); polypropylene (PP); thermoplastic copolymers of propylene with ethylene; ethylene/vinyl acetate (EVA) copolymers; ethylene/ethyl acrylate (EEA) copolymers, ethylene/butyl acrylate (EBA) copolymers; ethylene/α-olefin rubbers, in particular ethylene/propylene rubbers (EPR), ethylene/propylene/diene rubbers (EPDM); and mixtures thereof.

In an embodiment, the silicone gel as water-blocking material is a polyorganosiloxane, for example dimethylsiloxane, dimethyl-methylphenyl siloxane, methyl-phenylsiloxane.

In an embodiment, the silicone gel as water-blocking material has a drop point ≥250° C.

In an embodiment, the mica layer comprises one or two mica tapes. The mica tape/s is/are wound around the core comprising the central strength member and the buffer tubes. When two mica tapes are present, they can be wound in the same direction.

The metal armor of the cable of the disclosure can be made of any material suitable for providing the cable core with protection against external stress, in particular against compressive forces and to make the cable rodent-proof. In an embodiment, the armor is made of steel which can be in form of a corrugated tape or of a longitudinally sealed tube, optionally applied around the cable core by a draw down technique.

In an embodiment, a water swellable tape is interposed between the inner sheath and the metal armor.

In an embodiment, the inner sheath and/or the outer sheath are made of a flame retardant LSoH polymeric material. In an embodiment this material has a limiting oxygen index (LOI) ≥30%, for example ≥40%. In an embodiment, the flame retardant LSoH polymer-based material of the inner sheath and/or of the outer sheath can have a LOI≤70%, for example preferably ≤60%.

In an embodiment, the inner sheath and the outer sheath are made of the same LSoH flame-retardant polymeric material.

In another embodiment the LSoH flame-retardant polymeric material of the inner sheath has a LOI higher than that of the outer sheath material.

The polymer material of the inner and the outer sheath can be selected from the list already given in connection with the hydroxide-containing flame retardant material of the central strength member. The same applies for the inorganic-flame retardant filler contained therein.

In further embodiment, the buffer tubes are made of a polymer base mixed with inorganic-flame retardant filler/s, too.

In an embodiment, the amount of the flame-retardant filler in any flame retardant LSoH polymeric material for the cable of the present disclosure is lower than 500 phr, preferably from 130 phr to 300 phr.

Within the present description and the claims, the term "phr" (acronym of "parts per hundred of rubbers") is used to indicate parts by weight per 100 parts by weight of the polymer base material.

For the purpose of the present description and of the appended claims, except where otherwise indicated, all numbers expressing amounts, quantities, percentages and so forth, are to be understood as being modified in all instances by the term "about". Also, all ranges include any combination of the maximum and minimum points disclosed and include any intermediate ranges therein, which may or may not be specifically enumerated herein.

For the purpose of the present description and claims, an optical fiber comprises a core surrounded by a cladding, said core and cladding being preferably made of glass, and one or two protecting coatings based, for example, on acrylate material.

For the purpose of the present description and claims, as "limiting oxygen index" (LOI) it is meant the minimum concentration of oxygen, expressed as a percentage, that will support combustion of a polymer. Higher values of LOI indicate greater fire retardancy. LOI values are determined by standards, such as ASTM D2863-12 (2012).

The minimum concentration of oxygen, expressed as a percentage that will support combustion of a polymer. Higher values of LOI indicate greater fire retardancy. LOI values are determined by standards, such as ASTM D2863-12 (2012). The minimum concentration of oxygen, expressed as a percentage, that will support combustion of a polymer. Higher values of LOI indicate greater fire retardancy. LOI values are determined by standards, such as ASTM D2863-12 (2012).

For the purpose of the present description and appended claims, drop point is a numerical value assigned to a grease composition representing the temperature at which the first drop of material falls from a test cup. Drop point can be measured under the conditions set forth in ASTM D566-02 (2002).

In FIG. 1, the fiber optic cable is indicated by reference number 1.

Cable 1 comprises a core 1a. The core 1a, in turn, comprises a central strength member 2 and a plurality of buffer tubes 4, each comprising a plurality of optical fibers 5.

The central strength member 2 is an elongated member and it can have a circular or substantially circular cross-section. In the present embodiment, the central strength member comprises a body 2a of reinforced dielectric material, for example glass reinforced plastic (GRP), fiber reinforced plastic (FRP) or any other similar material.

The body 2a is covered by a coating 2b made of hydroxide-containing flame retardant LSoH polymeric material. The material of the coating 2b contains magnesium hydroxide in an amount of about 130 phr. This material can have a LOI of 28%.

A number of buffer tubes 4 are arranged radially outer with respect to the central strength member 2. In an embodiment, the buffer tubes 4 are stranded around the central strength member 2 in S-Z configuration.

In the embodiment of FIG. 1, eight buffer tubes 4 are provided around the central strength member 2. However, there could be more or less tubes in other embodiments.

The buffer tubes 4 can be made of any suitable polymeric material, for example polybutylene terephthalate (PBT). In an embodiment, the buffer tubes can be made of a hydroxide-containing flame retardant LSoH polymeric material.

Each buffer tube 4 contains a plurality of optical fibers. In an embodiment, each buffer tube 4 contains 12 optical fibers.

Each buffer tube 4 may contain water-blocking filling material 6 comprising a silicone gel with a drop point of at least 200° C.

For example, materials suitable as water-blocking filling for the cable of the present disclosure are polyorganosiloxane marketed as Rhodorsil® by Rhodia Siliconi Italia S.p.A., Italy.

It should be remarked that each single buffer tube 4 is not individually protected by fire resistant materials, for example mica tapes.

The core (1a) comprising buffer tubes 4 and central strength member 2 is wrapped by a mica layer 7.

In an embodiment, the mica layer 7 comprises two mica tapes. Mica, for example in form of flakes, may be bonded to a backing layer using a binding agent, such as silicone resin or elastomer, acrylic resin and/or epoxy resin. The backing layer may be formed of a supporting fabric, such as woven glass and/or glass cloth.

In an embodiment, each mica tape is wound with an overlapping. The overlapping can be higher than 40% and preferably of 50%.

In radial external position and in direct contact with the mica layer 7 a layer of glass yarns 8 is provided.

The layer of glass yarns 8 and the mica layer 7 act as fire barrier. The fire barrier layer has mainly the function of avoiding direct contact of the inner core with the flames which surround the cable in case of fire.

In radial external position and in direct contact with the layer of glass yarns Ban inner sheath 9 is provided. The inner sheath 9 can be extruded directly on the layer of glass yarns 8.

The inner sheath 9 can have a thickness between 1 and 3 mm. In one embodiment such thickness is of 1.5 mm.

The inner sheath 9 is made of a flame retardant LSoH polymer material. The material of the inner sheath 9 contains magnesium hydroxide in an amount of about 200 phr. This material can have a LOI of 37%.

In radially outer position with respect to the inner sheath 9 a metal armor 10 is provided. In the present embodiment, armor 10 is made of corrugated metal tape 10 made, at least partially, of steel, for example.

Armor 10 can have a thickness of 0.15 mm.

In one embodiment the metal armor has at least one surface coated with a polymer layer. In another embodiment the metal armor 10 has both the surfaces coated with a polymer layer.

In a radially outer position to and in direct contact with the metal armor 10, an outer sheath 11 is provided. The outer sheath 11 can be extruded directly on the armor 10.

The outer sheath 11 can have a minimum thickness between 1 and 3 mm. In one embodiment such thickness is of 1.4 mm.

Outer sheath 11 is made of a flame retardant LSoH polymeric material. The material of the inner sheath 11 contains magnesium hydroxide in an amount of about 200 phr. This material can have a LOI of 37%.

EXAMPLE

The Applicant has conducted fire-resistance tests on different cables.

All of the tested cables have a structure analogous to that of cable 1 of FIG. 1 and contained 72 fibers in 6 buffer tubes, 12 fibers each. The buffer tubes of Cable 1 (comparative) were filled with a severely hydrotreated and hydrocracked base mineral oil having a drop point lower than 200° C. (about 180° C.), while the buffer tubes of Cable 2 (according to the present disclosure) were filled with a polydimethyl-siloxane gel having a drop point greater than 250° C.

Cable 1 (comparative) had a central strength member made of GRP and no hydroxy-containing flame retardant polymeric material, while Cable 2 (according to the present disclosure) had a central strength member made of GRP covered by a coating made of hydroxy-containing flame retardant LSoH polymeric material having a LOI of 28%.

The inner and outer sheath of Cable 1 and Cable 2 were made of the same flame retardant LSoH polymer-based material containing magnesium hydroxide and having a LOI of about 37%.

Two standards were used for testing the above mentioned cables: IEC 60331-25 (1999) and EN 50200 (2106).

Cable 1 (comparative) failed both the fire resistance tests performed on this cable. Regarding test IEC 60331-25, after 90 minutes at 750° C., a 2.54 dB signal attenuation was detected. After a cooling of 4 minutes, a 5.58 dB signal attenuation was observed and cracks of the optical fibers were detected. Regarding test EN 50200, after 90 minutes at 830° C., a 1.24 dB signal attenuation was detected. As this standard does not prescribe a cooling period monitoring of the signal attenuation was continued after the flame was removed. A 5.54 dB signal attenuation was observed after 2 minutes of monitoring since the flame removal, and the fibers were found to be broken.

Cable 2 according to the present disclosure passed both the above mentioned tests. Regarding test IEC 60331-25, after 90 minutes at 750° C., a 1.34 dB signal attenuation was detected. After a cooling of 15 minutes, a 1.51 dB signal attenuation was detected, and the optical fibers were found to be fully functioning (not broken, no disconnection of signal). Regarding test EN 50200, after 120 minutes at 830° C., a 1.54 dB signal attenuation was detected. As this standard does not prescribe a cooling period, monitoring of the signal attenuation was continued after the flame was removed. The optical fibers were found to be fully functioning (not broken, no disconnection of signal).

In addition, Cable 2 according to the present disclosure was tested according to IEC 60332-3-24 (2000) and gave a flame propagation in vertical position of 770 mm (the maximum propagation according to the standard is 2,500 mm). Also Cable 2 was tested according to IEC 61034-2 (2005) relating to the density of the smoke generated by the cable while burning and gave a light transmission of 80.52% (the light transmission according to the standard has to be of at least 60%).

The invention claimed is:

1. A fiber optic cable comprising:
a core comprising:
a central strength member, and
a plurality of buffer tubes arranged around the central strength member, each of the plurality of buffer tubes comprising a plurality of optical fibers;
a mica layer arranged around the core;
a glass yarn layer surrounding and in direct contact with the mica layer;
an inner sheath surrounding and in direct contact with the glass yarn layer;
a metal armor surrounding the inner sheath; and
an outer sheath surrounding and in direct contact with the metal armor,
wherein the central strength member comprises a hydroxide-containing flame retardant polymeric material, and
wherein the buffer tubes contain a water-blocking filling material comprising a silicone gel, wherein the silicone gel has a drop point of at least 200° C., wherein the fiber optical cable is configured to be fire resistant.

2. The fiber optic cable of claim 1, wherein the plurality of optical fibers comprise at least 24 optical fibers.

3. The fiber optic cable of claim 1, wherein the central strength member comprises a body and hydroxide-containing flame retardant polymeric material is in form of a layer on the outer surface of the body.

4. The fiber optic cable of claim 1, wherein the hydroxide-containing flame retardant polymeric material of the central strength member is a low smoke zero halogen (LSoH) material.

5. The fiber optic cable of claim 1, wherein the hydroxide-containing flame retardant polymeric material of the central strength member has a limiting oxygen index, LOI, ≤35%.

6. The fiber optic cable of claim 1, wherein the silicone gel has a drop point of ≥250° C.

7. The fiber optic cable of claim 1, wherein a water swellable tape is interposed between the inner sheath and the metal armor.

8. The fiber optic cable of claim 1, wherein the inner sheath and the outer sheath are made of a flame retardant low smoke zero halogen (LSoH) polymer-based material.

9. The fiber optic cable of claim 8, wherein the flame retardant LSoH polymer-based material has a limiting oxygen index (LOI) ≥30%.

10. The fiber optic cable of claim 8, wherein the flame retardant LSoH polymer-based material has a limiting oxygen index (LOI) ≤70%.

11. The fiber optic cable of claim 8, wherein the inner sheath and the outer sheath are made of the same LSoH flame-retardant polymer-based material.

12. The fiber optic cable of claim 8, wherein the flame-retardant LSoH polymer-based material of the inner sheath has a LOI higher than that of the material of the outer sheath.

13. The fiber optic cable of claim 1, wherein the inner sheath is made of a flame retardant low smoke zero halogen (LSoH) polymer-based material.

14. The fiber optic cable of claim 1, wherein the outer sheath is made of a flame retardant low smoke zero halogen (LSoH) polymer-based material.

15. A fiber optic cable comprising:
a central strength member comprising a reinforced dielectric material;
a hydroxide-containing flame retardant polymeric material embedded in the reinforced dielectric material of the central strength member;
a plurality of buffer tubes disposed around the central strength member, each of the plurality of buffer tubes including a plurality of optical fibers;
a mica layer arranged around the plurality of buffer tubes;
a glass yarn layer disposed around and in direct contact with the mica layer;
an inner sheath surrounding and in direct contact with the glass yarn layer;
a metal armor surrounding the inner sheath; and
an outer sheath surrounding and in direct contact with the metal armor,
wherein the buffer tubes contain a water-blocking filling material comprising a silicone gel, wherein the silicone gel has a drop point of at least 200° C., and wherein the fiber optical cable is a fire resistant fiber optic cable that is configured to be fire resistant.

16. The fiber optic cable of claim 15, further comprising a water swellable tape interposed between the inner sheath and the metal armor, wherein the plurality of optical fibers comprise at least 24 optical fibers.

17. The fiber optic cable of claim 15, wherein the inner sheath is made of a flame retardant low smoke zero halogen (LSoH) polymer-based material.

18. The fiber optic cable of claim 15, wherein the outer sheath is made of a flame retardant low smoke zero halogen (LSoH) polymer-based material.

19. A fiber optic cable comprising:
a central strength member comprising a metallic material;
a layer of hydroxide-containing flame retardant polymeric material disposed around an outer surface of the central strength member;
a plurality of buffer tubes disposed around the central strength member, each of the plurality of buffer tubes including a plurality of optical fibers;
a mica layer arranged around the plurality of buffer tubes;
a glass yarn layer disposed around and in direct contact with the mica layer;
an inner sheath surrounding and in direct contact with the glass yarn layer;
a metal armor surrounding the inner sheath; and
an outer sheath surrounding and in direct contact with the metal armor,
wherein the buffer tubes contain a water-blocking filling material comprising a silicone gel, wherein the silicone gel has a drop point of at least 200° C., and wherein the fiber optical cable is a fire resistant fiber optic cable that is configured to be fire resistant.

20. The fiber optic cable of claim 19, further comprising a water swellable tape interposed between the inner sheath and the metal armor, wherein the plurality of optical fibers comprise at least 24 optical fibers, wherein the inner sheath or the outer sheath is made of a flame retardant low smoke zero halogen (LSoH) polymer-based material.

* * * * *